United States Patent
Standke et al.

(10) Patent No.: US 6,694,150 B1
(45) Date of Patent: Feb. 17, 2004

(54) MULTIPLE BAND WIRELESS TELEPHONE WITH MULTIPLE ANTENNAS

(75) Inventors: Randolph E. Standke, San Diego, CA (US); Joseph P. Burke, Carlsbad, CA (US); Peter Heidmann, Carlsbad, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/503,076

(22) Filed: Feb. 12, 2000

(51) Int. Cl.[7] .............................. H04M 1/00; H04B 7/00
(52) U.S. Cl. ................ 455/552.1; 455/41.2; 455/553.1; 343/702
(58) Field of Search .................. 455/573.1, 41, 455/456, 78, 552.1, 553.1, 41.1, 41.2, 456.1, 456.6, 82, 575.7; 342/357.12; 343/702, 850, 858

(56) References Cited

U.S. PATENT DOCUMENTS

| | | | | |
|---|---|---|---|---|
| 6,246,376 B1 | * | 6/2001 | Bork et al. | 343/760 |
| 6,275,707 B1 | * | 8/2001 | Reed et al. | 455/456 |
| 6,298,243 B1 | * | 10/2001 | Basile | 455/552 |
| 6,323,775 B1 | * | 11/2001 | Hansson | 340/636 |
| 6,340,928 B1 | * | 1/2002 | McCurdy | 340/436 |
| 6,424,300 B1 | * | 7/2002 | Sanford et al. | 343/702 |
| 6,434,403 B1 | * | 8/2002 | Ausems et al. | 455/556 |
| 6,442,375 B1 | * | 8/2002 | Parmentier | 455/78 |
| 2001/0018635 A1 | * | 8/2001 | Miyasaka et al. | 701/200 |
| 2002/0014990 A1 | * | 2/2002 | Kimura | 342/458 |
| 2002/0022465 A1 | * | 2/2002 | McCullagh et al. | 455/260 |

* cited by examiner

*Primary Examiner*—Erika Gary
(74) *Attorney, Agent, or Firm*—Philip R. Wadsworth; Charles O. Brown; Howard H. Seo

(57) ABSTRACT

A wireless telephone (102) includes a telephone transceiver (104), GPS receiver (106), and Bluetooth transceiver (108). The telephone antenna (110) is external, and the Bluetooth antenna (120) is internal. The GPS receiver (106) may be driven by its own internal antenna (326), or via a signal separator (116), (216), by either of the other antennas ((110), (120).

1 Claim, 3 Drawing Sheets

MULTIPLE BAND WIRELESS TELEPHONE WITH MULTIPLE ANTENNAS

BACKGROUND OF THE INVENTION

1. Technical Field

This invention relates to wireless telephones, and has particular relation to antenna architecture for multiple band wireless telephones.

2. Background Art

Wireless telephones have long had to operate in multiple frequency bands. The older cellular telephones operate at 800 MHz, while the more modern PCS (Personal Communication System) telephones operate at 1900 MHz. This could be done with a single antenna, operating as a quarter-wavelength antenna in the first band and as a half-wavelength band in the second. As additional features become available, however, additional antennas must be used. This is undesirable, since it adds to the weight and bulk of what is intended to be a lightweight, compact, and (most importantly) portable product—a wireless telephone.

BRIEF DISCLOSURE OF THE INVENTION

Applicants have overcome the limitations of the prior art, at least where the additional features are GPS and Bluetooth.

GPS is the Global Positioning System. A ground-based receiver receives precisely timed signals from several satellites. Each satellite has a precisely known position, a code for which is also included in the signal. By noting the time (and the differences in time) at which each signal is received, the receiver can calculate its own position. GPS operates at 1575 MHz.

The present invention provides wireless telephone, GPS, and Bluetooth capabilities in a single device with a single external antenna. Three embodiments are shown.

In the first embodiment, the telephone is designed to operate in only one telephone band. The external antenna is tuned for a multi-band response to access both telephone and GPS. A diplexer or electronic switch separates the telephone and GPS signals. An internal antenna is used for Bluetooth.

In the second embodiment, the telephone is designed to work in two telephone bands. The external antenna is used for both telephone bands. A single internal antenna is used for GPS and Bluetooth, with a similar diplexer or electronic switch.

The third embodiment is similar to the second, but uses two internal antennas, one for GPS and the other for Bluetooth. The diplexer or electronic switch is omitted.

DETAILED DESCRIPTION OF THE PREFERRED EMBODIMENTS

Figure 1:
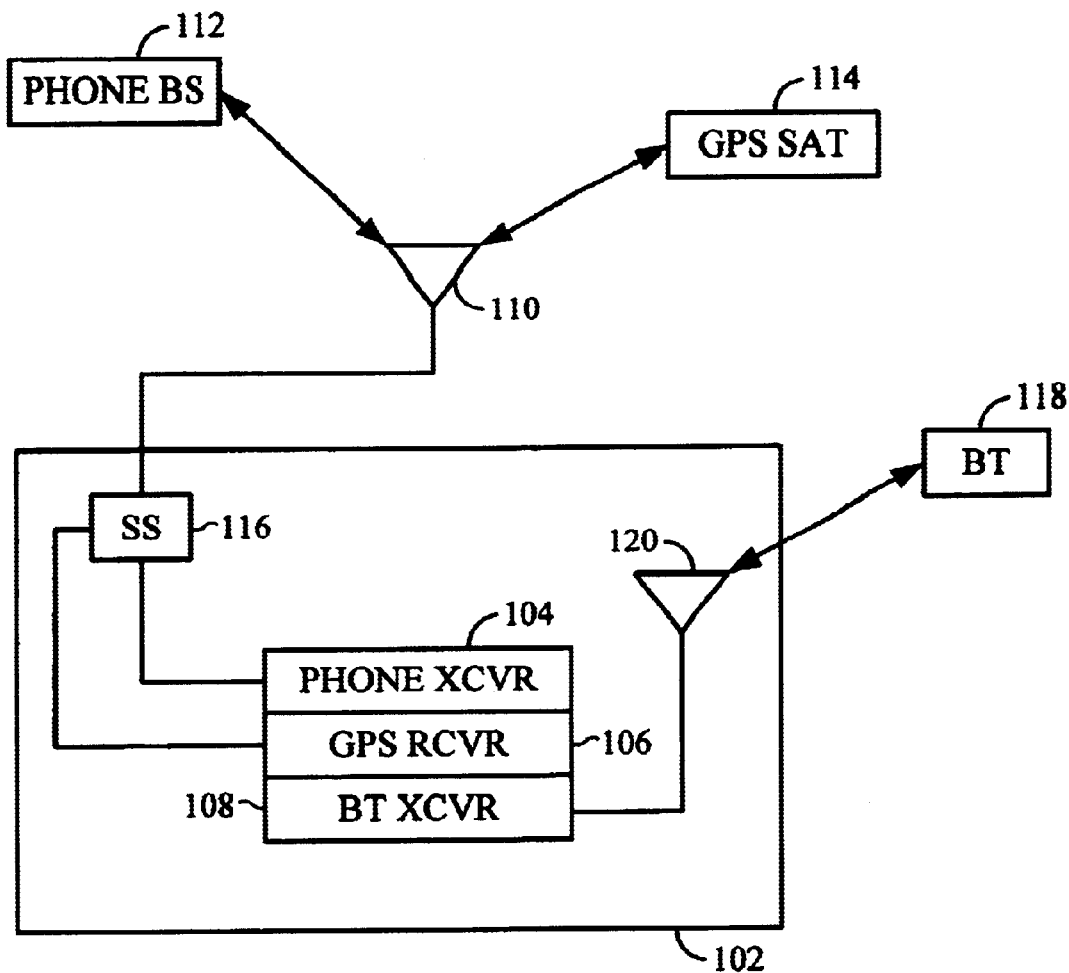
FIG. 1 is a block diagram of the first embodiment of the present invention.

FIG. 1 is a block diagram of the first embodiment of the present invention. A wireless telephone (102) has a telephone transceiver (104), GPS receiver (106), and Bluetooth receiver (108). An external antenna (110) receives telephone signals for a remote telephone base station (112), and also receives GPS signals from a constellation of remote GPS satellites (114). The signal separator separates the telephone signals and the GPS signals, and applies the telephone signal to the telephone transceiver (104) and the GPS signals to the GPS receiver (106). A remote Bluetooth device (118) sends signals to an internal Bluetooth antenna (120), which applies the Bluetooth signal to the Bluetooth Transceiver (108).

Figure 2:
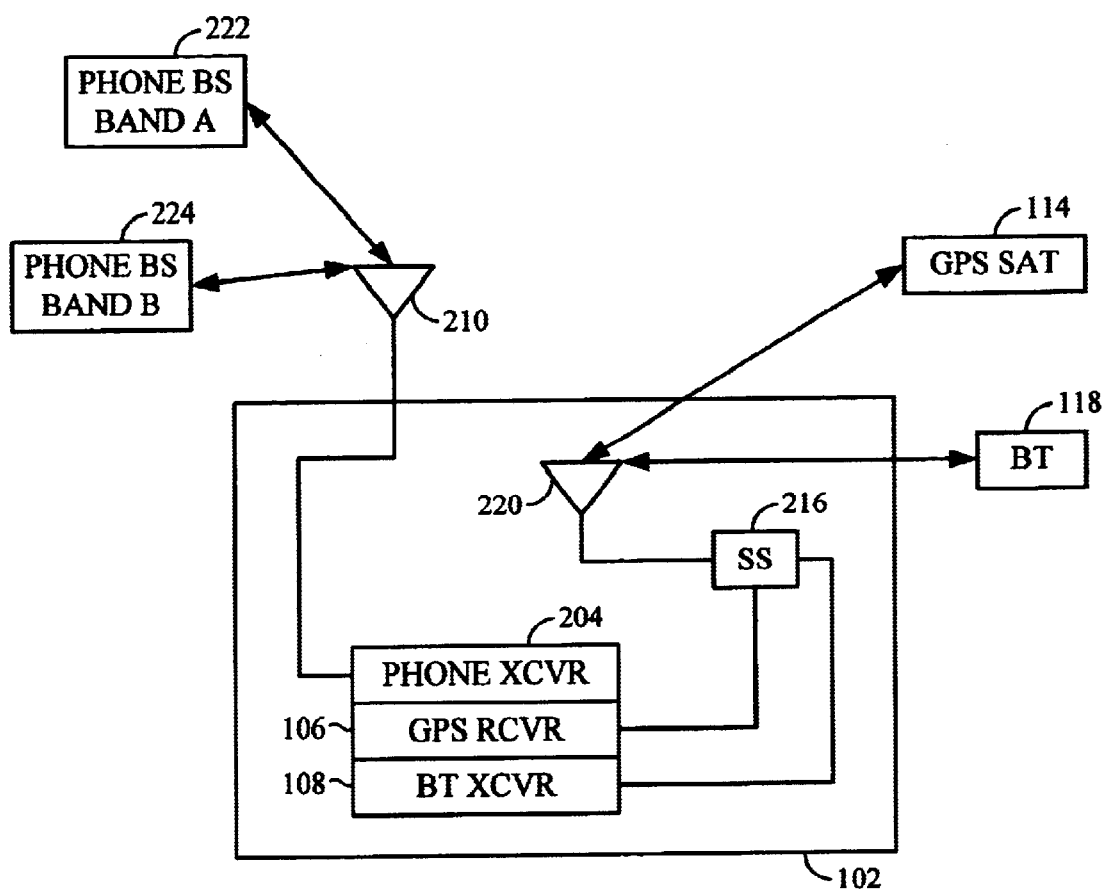
FIG. 2 is a block diagram of the second embodiment of the present invention.

FIG. 2 is a block diagram of the second embodiment of the present invention. FIG. 2 is generally the same a FIG. 1, with two exceptions.

First, the external antenna (110) of FIG. 1 has become external antenna (210), since it has been optimized to receive telephone signals on two bands rather than on one band. Signals on a first band are received from a first remote base station (222), and signals on a second band are received from a second remote base station (224). The two base stations may be co-located, and may even share an antenna, but are considered to be separate since they operate on different frequency bands. The single-band telephone transceiver (104) of FIG. 1 is changed to become dual-band telephone transceiver (204) of FIG. 2. Dual-band telephone transceivers sharing a common antenna are known in the art.

Second, the signal separator (116) of FIG. 1 has become signal separator (216) of FIG. 2, since it separates GPS and Bluetooth signals rather than GPS and telephone signals. Internal antenna (120) of FIG. 1 has become internal antenna (220) of FIG. 2, since it has been optimized to receive both GPS and Bluetooth signals, rather than just Bluetooth signals. The signal separator (216) receives Bluetooth signals and GPS signals from the internal antenna (220) and separates the two signals. It then applies the Bluetooth signals to the Bluetooth transceiver (108) and the GPS signals to the GPS receiver (106).

Figure 3:
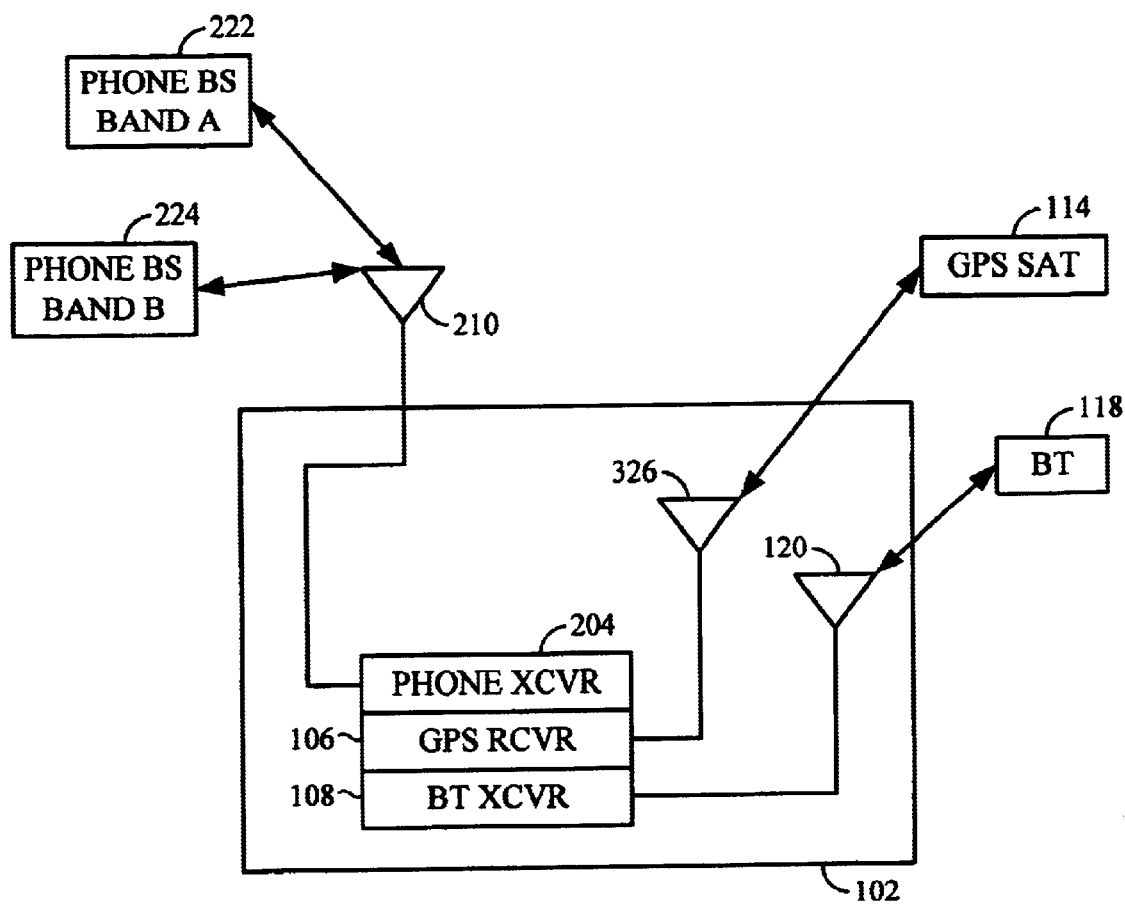
FIG. 3 is a block diagram of the third embodiment of the present invention.

FIG. 3 is a block diagram of the third embodiment of the present invention. FIG. 3 is generally the same a FIG. 2, with one exception. The signal separator (216) has been removed, and a separate, internal, GPS antenna (326) has been added, which directly applies GPS signals to the GPS receiver. The Bluetooth antenna (120) applies Bluetooth signals to the Bluetooth transceiver (108), as in FIG. 1.

INDUSTRIAL APPLICATION

This invention is capable of exploitation in industry, and can be made and used, whenever is it desired to provide a wireless telephone with GPS and method shown herein, taken separate and apart from one another, may be entirely conventional, it being their combination that is claimed as the invention.

While various modes of apparatus and method have been described, the true spirit and scope of the invention are not limited thereto, but are limited only by the following claims and their equivalents, and such are claimed as the invention.

What is claimed is:

1. A wireless telephone, wherein:
   a. the telephone includes
      i. a telephone transceiver;
      ii. an external antenna connected to the telephone transceiver; and
      iii. a Global Positioning System (GPS) receiver connected to an internal antenna; and
   b. the telephone is characterized in that the telephone also includes a Bluetooth transceiver connected to the internal antenna and the telephone further includes a signal separator connected to:
   c. receive Bluetooth signals and GPS signals from the internal antenna;
   d. separate the Bluetooth signals and the GPS signals;
   e. apply the Bluetooth signals to the Bluetooth transceiver; and apply the GPS signals to the GPS receiver.

* * * * *